US007473879B2

(12) United States Patent
Ng et al.

(10) Patent No.: US 7,473,879 B2
(45) Date of Patent: Jan. 6, 2009

(54) LED ILLUMINATION SYSTEM HAVING AN INTENSITY MONITORING SYSTEM

(75) Inventors: Fook Chuin Ng, Butterworth (MY); Kee Yean Ng, Peral (MY); Heng Yow Cheng, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 741 days.

(21) Appl. No.: 10/979,058

(22) Filed: Nov. 1, 2004

(65) Prior Publication Data

US 2005/0133686 A1 Jun. 23, 2005

Related U.S. Application Data

(63) Continuation-in-part of application No. 10/742,270, filed on Dec. 19, 2003, now Pat. No. 7,294,816.

(51) Int. Cl.
*G01J 1/32* (2006.01)

(52) U.S. Cl. ...................................... 250/205; 250/239

(58) Field of Classification Search ................. 250/205, 250/239, 221, 214 R, 214 P, 214 D, 216, 250/227.11, 227.21, 227.22, 227.24, 551
See application file for complete search history.

(56) References Cited

U.S. PATENT DOCUMENTS

| | | | | |
|---|---|---|---|---|
| 5,489,771 | A | 2/1996 | Beach | |
| 5,504,762 | A | 4/1996 | Hutchison | |
| 5,812,710 | A | 9/1998 | Sugaya | |
| 6,097,748 | A | 8/2000 | Huang et al. | |
| 6,107,620 | A | 8/2000 | Shiba et al. | |
| 6,325,524 | B1 * | 12/2001 | Weber et al. | 362/245 |
| 6,489,600 | B1 | 12/2002 | Taguchi | |
| 6,527,460 | B2 | 3/2003 | Cohen et al. | |
| 6,744,480 | B2 * | 6/2004 | Kaneko | 349/65 |
| 2002/0139918 | A1 | 10/2002 | Jung et al. | |
| 2003/0030808 | A1 * | 2/2003 | Marshall et al. | 356/406 |
| 2003/0116695 | A1 | 6/2003 | Masuda et al. | |
| 2003/0193008 | A1 | 10/2003 | Barna et al. | |
| 2004/0070337 | A1 | 4/2004 | Goh et al. | |

FOREIGN PATENT DOCUMENTS

| | | | |
|---|---|---|---|
| GB | 2 168 838 | A | 3/1985 |
| WO | WO 01/99191 | A1 | 12/2001 |

* cited by examiner

*Primary Examiner*—Que T Le

(57) ABSTRACT

A light source and method for controlling the same is disclosed. The light source includes a first component light source that includes N LEDs, a photo-detector, and a light redirector, where N>1. Each LED has a light emitting chip in a package. The light emitting chip emits light in a forward direction and light in a side direction. The light generated in the forward direction is determined by a drive signal coupled to that LED. A portion of the light in the side direction leaves the package. The light redirector is positioned such that a portion of the light in the side direction that leaves the package of each of the LEDs is scattered onto the photo-detector. The photo-detector generates N intensity signals, each intensity signal having an amplitude related to the intensity of the light emitted in the side direction by a corresponding one of the LEDs.

10 Claims, 4 Drawing Sheets

LED ILLUMINATION SYSTEM HAVING AN INTENSITY MONITORING SYSTEM

RELATED APPLICATIONS

This is a continuation-in-part of U.S. patent application Ser. No. 10/742,270 filed on Dec. 19, 2003 now U.S. Pat. No. 7,294,816.

BACKGROUND OF THE INVENTION

Light emitting diodes (LEDs) are attractive candidates for replacing conventional light sources such as incandescent lamps and fluorescent light sources. The LEDs have higher light conversion efficiencies and longer lifetimes. Unfortunately, LEDs produce light in a relatively narrow spectral band. Hence, to produce a light source having an arbitrary color, a compound light source having multiple LEDs is typically utilized. For example, an LED-based light source that provides an emission that is perceived as matching a particular color can be constructed by combining light from red, green, and blue emitting LEDs. The ratios of the intensities of the various colors sets the color of the light as perceived by a human observer.

Unfortunately, the output of the individual LEDs vary with temperature, drive current, and aging. In addition, the characteristics of the LEDs vary from production lot to production lot in the manufacturing process and are different for different color LEDs. Hence, a light source that provides the desired color under one set of conditions will exhibit a color shift when the conditions change or the device ages. To avoid these shifts, some form of feedback system must be incorporated in the light source to vary the driving conditions of the individual LEDs such that the output spectrum remains at the design value in spite of the variability in the component LEDs used in the light source.

White light sources based on LEDs are in backlights for displays and projectors. If the size of the display is relatively small, a single set of LEDs can be used to illuminate the display. The feedback photodetectors in this case are located in a position that collects light from the entire display after the light from the individual LEDs is mixed.

As the size of the display increases, an array of LED light sources is needed to provide uniform illumination over the entire array. Such an array complicates the feedback system. If the photodetectors are positioned in the mixing cavity, light from the entire display is collected and analyzed. Hence, only the overall light intensity level of each color can be adjusted by the feedback system. Thus, if a particular LED is performing differently from the others that supply light in that color, the feedback system cannot adjust only that LED.

SUMMARY OF THE INVENTION

The present invention includes a light source and method for controlling the same. The light source includes a first component light source that includes N LEDs, a photo-detector, and a light redirector, where N>1. Each LED has a light emitting chip in a package. The light emitting chip emits light in a forward direction and light in a side direction. The light generated in the forward direction is determined by a drive signal coupled to that LED. A portion of the light in the side direction leaves the package. The light redirector is positioned such that a portion of the light in the side direction that leaves the package of each of the LEDs is scattered onto the photo-detector. The photo-detector generates N intensity signals, each intensity signal having an amplitude related to the intensity of the light emitted in the side direction by a corresponding one of the LEDs. The intensity of light in the side direction is a fixed fraction of the intensity of light in the forward direction.

DETAILED DESCRIPTION OF THE PREFERRED EMBODIMENTS OF THE INVENTION

Figure 1B:
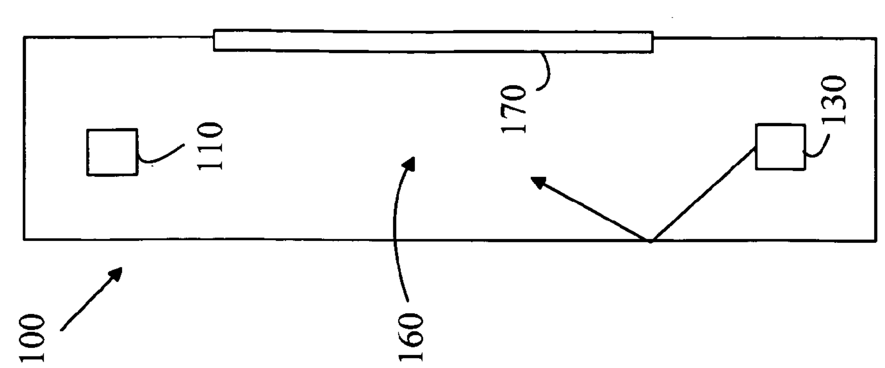
FIGURE 1B (PRIOR ART)
FIG. 1B is an end view of display system.
Figure 1A:
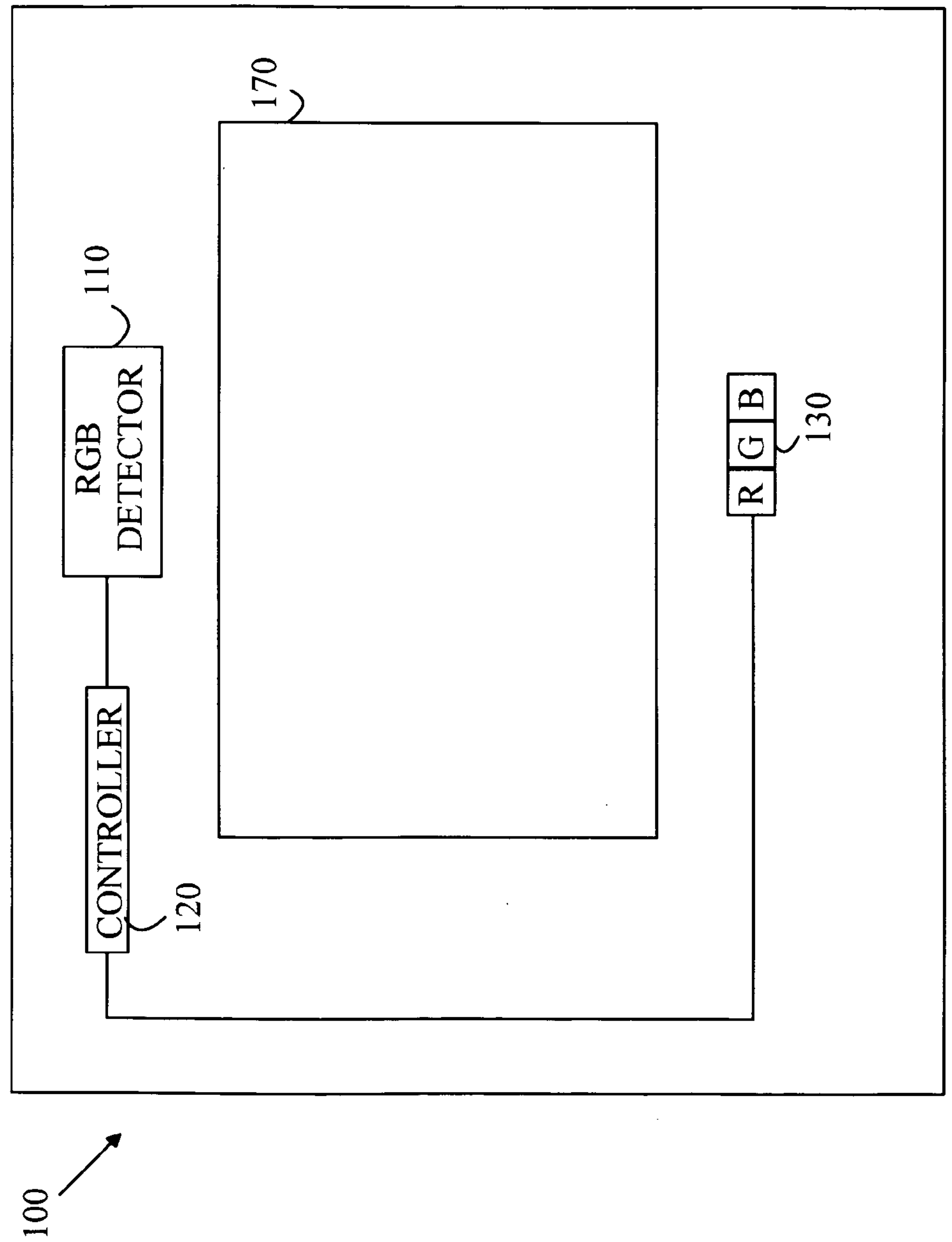
FIGURE 1A (PRIOR ART)
FIG. 1A is a top view of a prior art display system.

The manner in which the present invention provides its advantages can be more easily understood with reference to FIGS. 1A and 1B. FIG. 1A is a top view of a prior art display system 100. FIG. 1B is an end view of display system 100. Display system 100 utilizes an LED source 130 having red, green, and blue LEDs to illuminate a display device 170 from a location behind display device 170. For example, display device 170 may include an imaging array constructed from an array of transmissive pixels. Light from LED source 130 is "mixed" in a cavity 160 behind display device 170 to provide uniform illumination of display device 170. The walls of this cavity are typically reflective. A photo-detector 110 measures the intensity of light in cavity 160 at three wavelengths corresponding to the LEDs in LED source 130. A controller 120 uses these measurements in a servo loop to adjust the drive currents of each of the LEDs in LED source 130 to maintain the desired illumination spectrum.

As the size of the display increases, the LEDs must be replaced by arrays of LEDs that have a spatial extent that is determined by the size of the display and the amount of light needed to illuminate the display. There is a practical limit to the amount of light that can be generated from a single LED. Hence, an illumination based on one set of RGB LEDs is limited to relatively small displays. To increase the available light beyond this limit, multiple sets of LEDs are required. Since the properties of the LEDs differ significantly from production batch to production batch, each set of LEDs must be separately controlled in a feedback loop to maintain the desired spectrum. Hence, a photo-detector array that samples light in the mixing cavity after the light from the various LEDs has been mixed together can only provide information about the overall performance of the array at each color. This information is insufficient to adjust the drive currents of the individual LEDs. The present invention overcomes this problem by providing an LED light source in which the light from each of the component LEDs is measured separately even when a number of LEDs of the same color are present in the mixing cavity.

The present invention utilizes the observation that a portion of the light generated in an LED is trapped in the active region of the LED and exits the LED through the sides of the chip. In general, an LED is constructed from a layered structure in which a light-generating region is sandwiched between n-type and p-type layers. The light that travels in a direction at about 90 degrees to the surface of the top or bottom layer is extracted and forms the output of the LED. The air/semiconductor boundary at the top of the LED and the semiconductor/ substrate boundary under the LED are both boundaries between two regions having markedly different indices of refraction. Hence, light generated in the active region at angles greater than the critical will be internally reflected at these boundaries and remain trapped between the two boundaries until the light is either absorbed or reaches the edge of the LED chip. A significant fraction of this trapped light strikes the chip/air boundary at the edge of the chip at an angle that is less than the critical angle, and hence, escapes the chip.

The present invention utilizes this edge-emitted light to provide a monitoring signal. In general, the amount of light that exits the chip at the edge is a fixed fraction of the total light being generated in the LED. The precise fraction varies from chip to chip; however, the fractional value for each chip can be determined at the time the LED is manufactured or by calibrating the light source after the LEDs have been installed.

Figure 2:
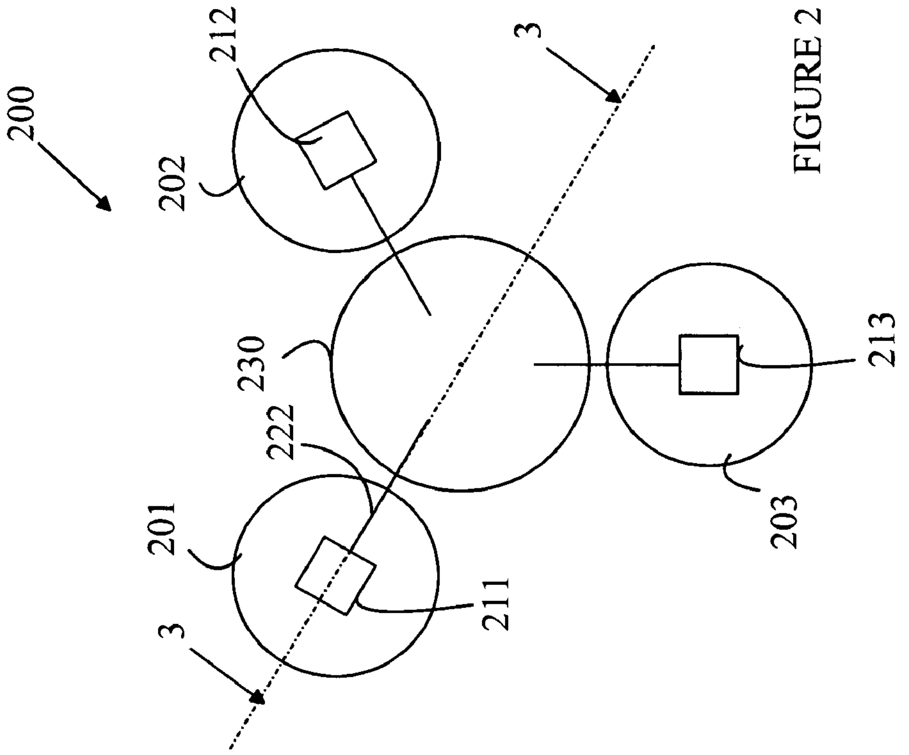
FIG. 2 is a top view of a component light source.
Figure 3:
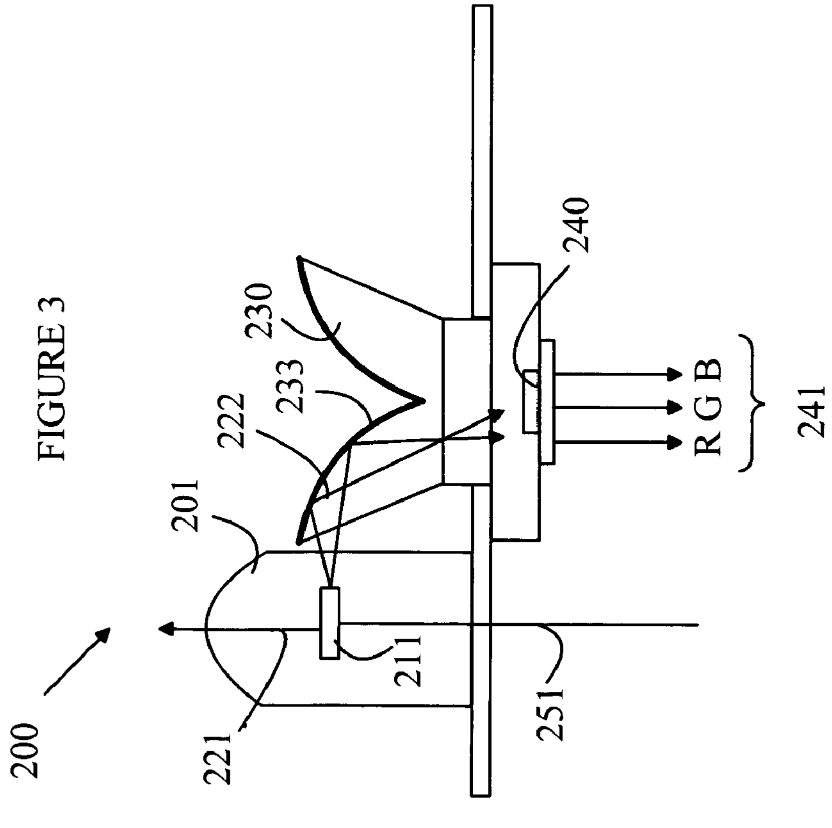
FIG. 3 is a cross-sectional view through line 3-3, shown in FIG. 2.

Refer now to FIGS. 2 and 3, which illustrate a RGB component light source 200 according to one embodiment of the invention described in the above-identified co-pending patent application which is hereby incorporated by reference. FIG. 2 is a top view of a component light source 200, and FIG. 3 is a cross-sectional view through line 3-3. Component light source 200 includes three LEDs 201-203 that emit red, green, and blue light, respectively. Each LED includes a chip that emits a fraction of the light generated therein through the side of the chip. The LED has a body, which includes a transparent region that allows this light to exit in a direction that is different from that of the light that is emitted in a direction perpendicular to the chip surface. The chips in LEDs 201-203 are shown at 211-213, respectively.

Referring to FIG. 3, the light leaving the top of the chip is shown at 221, and the light leaving the side of the chip is shown at 222. To simplify the following discussion, the light leaving the top of the chip will be referred to as the "output light", and the light leaving the side of the chip after one or more internal reflections at angles greater than the critical angle in the LED will be referred to as the side light. The present invention collects a portion of the side light using a collector 230. The light that is so collected will be referred to as the monitor light. The monitor light is directed onto a photo-detector 240 that measures the intensity of light in each of the three spectral regions of interest. In this case, photo-detector 240 measures light in the red, blue, and green spectral bands and generates the three signals shown at 241 whose amplitudes are a function of the measured intensities. The amplitude of these signals is, in turn, a measure of the output light. In the following discussion, these signals will be referred to as the monitor signals.

Photo-detector 240 can be constructed from 3 optical filters and 3 photodiodes for measuring the light transmitted by each filter. To simplify the drawing, the component photodiodes and optical filters have been emitted from the drawing.

In the embodiment shown in FIGS. 2 and 3, collector 230 is a circularly symmetric collector that has a surface 233 that reflects a portion of the side light leaving LED 201 in a downward direction such that the photo-detector monitors light from only that set of LEDs. The collector can be constructed from a clear plastic. The reflectivity of the surface can be the result of the difference in the index of refraction of the plastic and air. Alternatively, the surface can be coated with a reflecting material such as aluminum.

In general, the ratio of the monitor light to the output light will vary from LED to LED. However, the precise value of this ratio does not need to be determined so long as it remains constant. As noted above, the monitor signals are used by a feedback controller to maintain the correct red, blue, and green light intensities to generate the desired spectrum. Each LED has a separate power line on which the LED receives a signal whose average current level determines the light output by that LED. The power line for LED 201 is shown at 251. The feedback controller adjusts the drive current to each LED until the monitor signals match target values stored in the feedback controller.

The target values can be determined experimentally by analyzing the light generated by the component light source as a function of the drive currents to the LEDs. When a satisfactory spectrum is achieved using only that component LED, the values of the monitor signals are recorded by the controller. The feedback controller then adjusts the drive currents to maintain the monitor signals at these recorded target values during the normal operation of the component light source. If, for example, one of the LEDs ages, and hence, produces less light, the monitor signal associated with-that LED will be reduced in value. The feedback controller will then increase the drive current to that LED until the monitor signal once again matches the target value for that LED.

Figure 4:
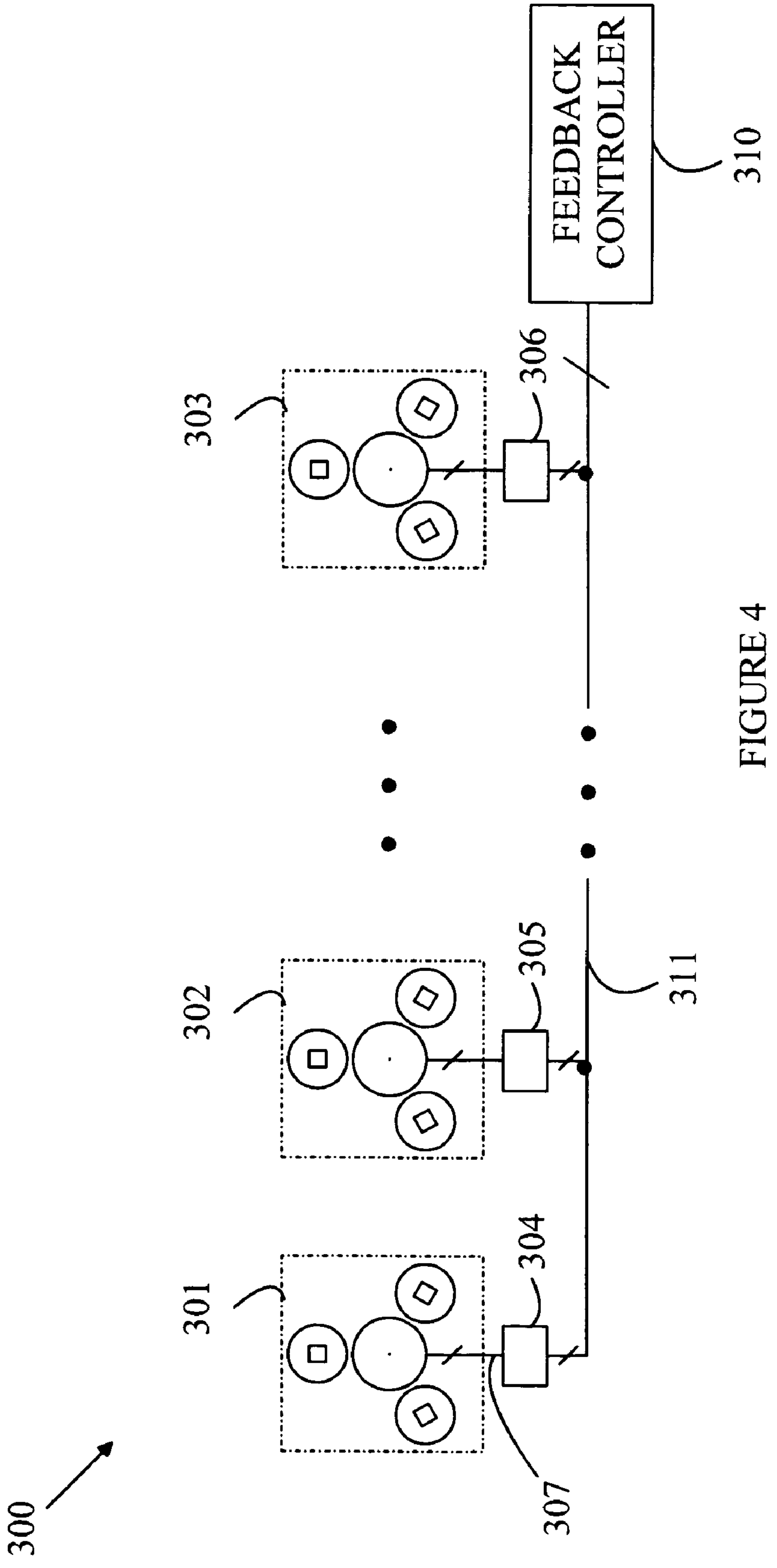
FIG. 4 is a top view of an extended light source.

The component light sources discussed above can be combined to construct extended light sources for illuminating a cavity in a manner analogous to that discussed above with reference to FIG. 1. Refer now to FIG. 4, which is a top view of an extended light source 300. Light source 300 may be viewed as a linear light source having a constant light intensity along its length. Light source 300 is constructed from a plurality of component light sources of the type discussed above with reference to FIGS. 2 and 3. Exemplary component light sources are shown at 301-303.

Each component light source has six signal lines that may be viewed as a component bus 307. Component bus 307 includes the three lines that transmit the monitor signals and the three power lines that drive the individual LEDs within the component light source. The component bus is connected to a control bus 311 by an interface circuit. The interface circuits corresponding to component light sources 301-303 are shown at 304-306, respectively.

In this embodiment, each interface circuit provides two functions. First, the interface circuit selectively connects the monitor signals to a feedback controller 310 and receives signals specifying the drive currents to be applied to each of the LEDs in the component light source. The interface circuit includes an address that allows feedback controller 310 to selectively communicate with the interface circuit.

Second, the interface current includes the circuitry that maintains the drive current on each LED at the levels specified by the feedback controller when the component light source is not connected to bus 311. To carry out this function, the interface circuit includes three registers that hold values that determine the drive currents to each LED and the circuitry for converting these values into the actual drive currents. The drive currents may be set by varying the magnitude of a DC current through each LED or by varying the duty factor of an AC signal that switches the LED "on" and "off".

The above-described embodiments utilize an optical collector that collects a portion of the light leaving the side of an LED and directs that light downward to a photo-detector. These optical collectors are reflectors and are relatively expensive to fabricate. The present invention provides this optical sampling function without polished reflectors, and hence, reduces the associated cost. The present invention is based on the observation that any device that redirects a fraction of the sidelight to the photodetector can be utilized to provide the light needed by the feedback controller. The only requirement for this light redirector is that the fraction of the light be constant over time and that enough light is reflected to provide an accurate measure of the sidelight.

Figure 5:
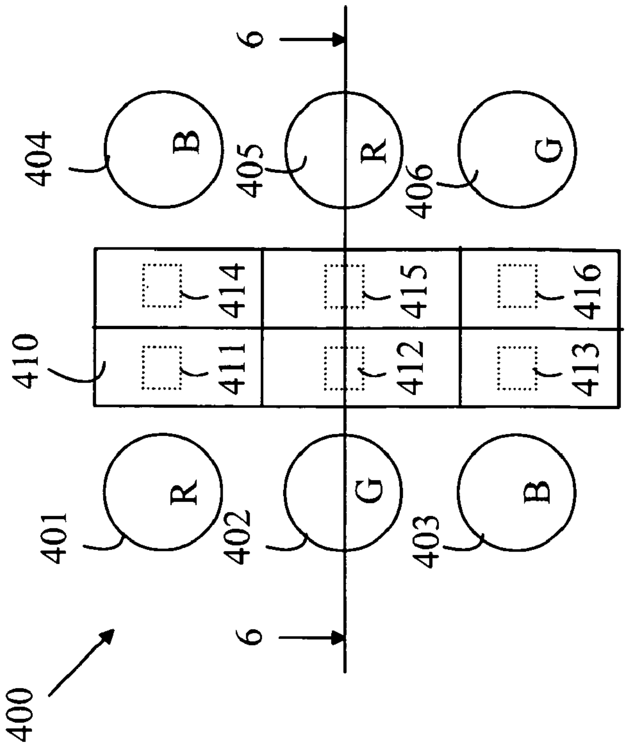
FIG. 5 is a top view of component light source.
Figure 6:
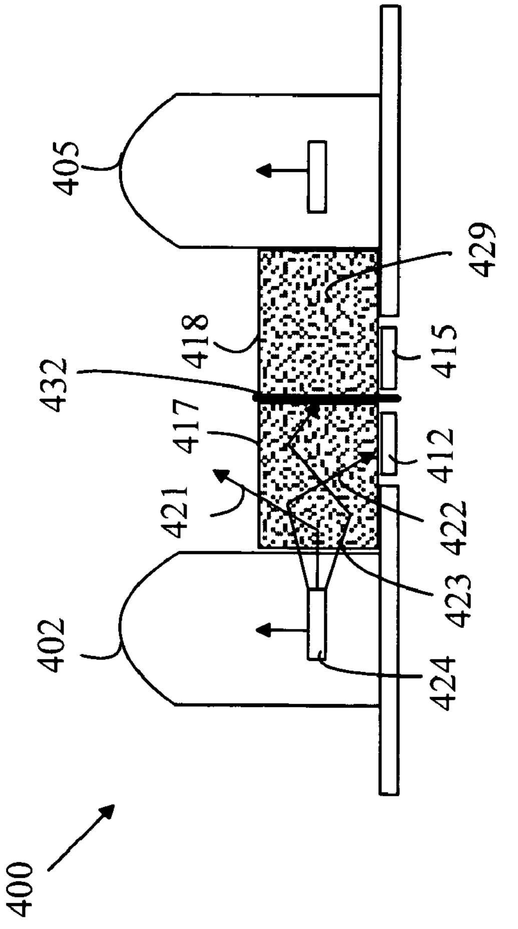
FIG. 6 is a cross-sectional view of the component light source shown in FIG. 5 through line 6-6.

Refer now to FIGS. 5 and 6, which illustrate a component light source that utilizes a light redirector according to one embodiment of the present invention. FIG. 5 is a top view of component light source 400, and FIG. 6 is a cross-sectional view of component light source 400 through line 6-6. Component light source 400 has six LEDs shown at 401-406. A portion of the sidelight from each of these LEDs is redirected by scattering medium onto a photo-detector. The photo-detectors for LEDs 401-406 are shown at 411-416, respectively. Light redirector 410 includes a clear medium having scattering particles 429 suspended therein. The portions of the scattering medium used by LEDs 402 and 405 are shown at 417 and 418, respectively.

Refer now to FIG. 6 and specifically to the sidelight leaving die 424 in LED 402. Some of the light will be scattered by the particles. A portion of this scattered light will be directed into photo-detector 412 as shown at 422. Other particles will direct the sidelight into the output light as shown at 421. The remainder of the light will be absorbed by the medium or the walls of the redirector as shown at 423.

The embodiment shown in FIGS. 5 and 6 utilizes opaque walls as shown at 432 to prevent light from one LED reaching the detector utilized by another LED. However, these walls can be omitted if the scattering medium attenuates the light sufficiently or if the neighboring photo-detector does not respond to the light in question. For example, if the neighboring photo-detectors are sensitive to a different color of light, such walls can be omitted.

The redirectors can be prefabricated and attached to the printed circuit board. Since the redirectors scatter the light and since the exact fraction transferred can vary between LEDs, the present invention can tolerate substantial alignment and positioning errors. In embodiments in which the cross-walls are not needed because the cross-talk between adjacent detectors is insignificant, the redirectors can be constructed by applying a layer of scattering medium between the LEDs. For example, a layer of silicon rubber having the scattering particles suspended therein can be dispensed over the photo-detectors to a height that will intercept the sidelight.

The above-described embodiments have utilized component light sources that are constructed from red, green, and blue LEDs. However, embodiments of the present invention that utilize different numbers and colors of LEDs can also be constructed. For example, a light source that appears white to a human observer can be constructed by mixing light from a blue-emitting LED and a yellow-emitting LED. Hence, a white light source based on component light sources having two LEDs according to the present invention would be utilized to provide an extended white light source. Similarly, color schemes based on four colors are known to the printing arts. In such a color scheme, a component light source according to the present invention would have 4 LEDs.

Various modifications to the present invention will become apparent to those skilled in the art from the foregoing description and accompanying drawings. Accordingly, the present invention is to be limited solely by the scope of the following claims.

What is claimed is:

1. A light source comprising a first component light source, said component light source comprising:

N LEDs, each LED having a light emitting chip in a package, said light emitting chip emitting light in a forward direction through a top surface of said light emitting chip and light in a side direction through a side surface of said light emitting chip, wherein N>1, said light generated in said forward direction being determined by a drive signal coupled to that LED, a portion of said light in said side direction leaving said package;

a photo-detector; and a light redirector positioned to scatter a portion of said light in said side direction that leaves said package of each of said LEDs onto said photo-detector, said photo-detector generating N intensity signals, each intensity signal having an amplitude related to the intensity of said light emitted in said side direction by a corresponding one of said LEDs and being independent of the intensity of light emitted by any other LED in said light source.

2. The light source of claim 1 wherein the intensity of light in said side direction is a fixed fraction of the intensity of light in said forward direction.

3. A light source comprising a first component light source, said component light source comprising:

N LEDs, each LED having a light emitting chip in a package, said light emitting chip emitting light in a forward and light in a side direction, wherein N>1, said light generated in said forward direction being determined by a drive signal coupled to that LED, a portion of said light in said side direction leaving said package;

a photodetector; and a light redirector positioned to scatter a portion of said light in said side direction that leaves said package of each of said LEDs onto said photo-detector, said photo-detector generating N intensity signals, each intensity signal having an amplitude related to the intensity of said light emitted in said side direction by a corresponding one of said LEDs;

wherein said light redirector comprises a clear medium having light scattering particles dispersed therein.

4. The light source of claim 1 wherein each of said LEDs emits light at a wavelength that is different from the wavelengths at which the others of said LEDs emit light.

5. A source comprising a first component light source, said component light source comprising:

N LEDs, each LED having a light emitting chip in a package, said light emitting chip emitting light in a forward and light in a side direction, wherein N>1, said light generated in said forward direction being determined by a drive signal coupled to that LED, a portion of said light in said side direction leaving said package;

a photo-detector, and a light redirector positioned to scatter a portion of said light in said side direction that leaves said package of each of said LEDs onto said photo-detector, said photo-detector generating N intensity signals, each intensity signal having an amplitude related to the intensity of said light emitted in said side direction by a corresponding one of said LEDs;

wherein said first component light source comprises a bus and a first interface circuit for controlling N signals, each signal determining a light intensity to be generated in said forward direction by a corresponding one of said LEDs, said interface circuit further coupling said N intensity signals to said bus in response to a control signal identifying said first interface.

6. The light source of claim 5 comprising a second component light source, said second component light source comprising:

N LEDs, each LED having a light emitting chip in a package, said light emitting chip emitting Light in a forward direction through a top surface of said light emitting chip and light in a side direction through a side surface of said light emitting chip, wherein N>1, said light generated in said forward direction being determined by a drive signal coupled to that LED, a portion of said light in said side direction leaving said package;

a photo-detector;

a light redirector positioned to scatter a portion of said light in said side direction that leaves said package of each of said LEDs onto said photo-detector, said photo-detector generating N intensity signals, each intensity signal having an amplitude related to the intensity of said light emitted in said side direction by a corresponding one of said LEDs and a second interface circuit for controlling N signals, each signal determining a light intensity to be generated in said forward direction by a corresponding one of said LEDs and being independent of the intensity of light emitted by any other LED in said second component light source, said interface circuit further coupling said N intensity signals to said bus in response to a control signal identifying said second interface.

7. The light source of claim 6 further comprising a feedback controller connected to said bus, said feedback controller utilizing said intensity signals of each of said first and second component light sources to control said drive signals.

8. A method for illuminating a device with light from a plurality of LEDs, each LED having a light emitting chip in a package, said light emitting chip emitting light in a forward direction through a top surface of said light emitting chip and light in a side direction through a side surface of said light emitting chip, said light generated in said forward direction being determined by a drive signal coupled to that LED,a portion of said light in said side direction leaving said package, said method comprising:

scattering a portion of said light in said side direction from each of said LEDs;

measuring the intensity of said scattered fight for each of said LEDs to generate a measured intensity value for each of said LEDs, said value being independent of the intensity of light emitted by any other LED in said plurality of LEDs;

controlling said drive signals of said LEDs to maintain each of said measured intensity values at a target value.

9. The method of claim 8 wherein said light in said forward direction is used to illuminate said device.

10. The method of claim 8 wherein one of said LEDs emits light of a color different from the light emitted by another one of said LEDs.

* * * * *

UNITED STATES PATENT AND TRADEMARK OFFICE

CERTIFICATE OF CORRECTION

PATENT NO. : 7,473,879 B2
APPLICATION NO. : 10/979058
DATED : January 6, 2009
INVENTOR(S) : Fook Chuin Ng, Kee Yean Ng and Heng Yow Cheng It is certified that error appears in the above-identified patent and that said Letters Patent is hereby corrected as shown below:

Column 6, Line 24, Claim 3, delete “photodetector;” and insert --photo-detector--.

Column 6, Line 37, Claim 5, delete “A source” and insert --A light source--.

Column 6, Line 64, Claim 6, delete “Light” and insert --light--.

Column 8, Line 5, Claim 8, delete “LED,a” and insert --LED, a--.

Column 8, Line 10 (approx.), Claim 8, delete “fight” and insert --light--.

Signed and Sealed this
Twenty-eighth Day of December, 2010

David J. Kappos
*Director of the United States Patent and Trademark Office*